United States Patent
Jafarian

(10) Patent No.: US 9,485,658 B2
(45) Date of Patent: Nov. 1, 2016

(54) SYSTEM AND METHOD FOR IMPROVED COMMUNICATION ON A WIRELESS NETWORK

(71) Applicant: QUALCOMM Incorporated, San Diego, CA (US)

(72) Inventor: Amin Jafarian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/482,399

(22) Filed: Sep. 10, 2014

(65) Prior Publication Data

US 2015/0074772 A1 Mar. 12, 2015

Related U.S. Application Data

(60) Provisional application No. 61/876,755, filed on Sep. 11, 2013, provisional application No. 61/899,880, filed on Nov. 5, 2013.

(51) Int. Cl.
| | |
|---|---|
| *H04L 29/06* | (2006.01) |
| *H04W 12/08* | (2009.01) |
| *H04W 74/00* | (2009.01) |
| *H04W 84/12* | (2009.01) |

(52) U.S. Cl.
CPC .......... *H04W 12/08* (2013.01); *H04L 63/0263* (2013.01); *H04W 74/006* (2013.01); *H04L 63/102* (2013.01); *H04W 84/12* (2013.01)

(58) Field of Classification Search
CPC ... H04L 63/00; H04L 63/0263; H04L 63/10; H04L 63/108; H04L 63/20; H04L 63/205
See application file for complete search history.

(56) References Cited

U.S. PATENT DOCUMENTS

| | | |
|---|---|---|
| 2013/0128798 A1 | 5/2013 | Liu |
| 2014/0071900 A1* | 3/2014 | Park ...................... H04W 74/04 370/329 |

OTHER PUBLICATIONS

Choo L C., (Institute for INFOCOMM Research (I2R)): "Jan. 2013 F2F TGah meeting minutes, 11-13-0155-00-00ah-january-2013-f2f-tgah-meeting-minutes", IEEE SA Mentor, 11-13-0155-00-00ah-january-2013-f2f-tgah-meeting-minutes, IEEE-SA Mentor, Piscataway, NJ USA, vol. 802. 11ah, Jan. 17, 2013, pp. 1-11, XP068040563, [retrieved on Jan. 17, 2013] Section 6.3.5.

(Continued)

*Primary Examiner* — Edward Zee
(74) *Attorney, Agent, or Firm* — Patterson & Sheridan, LLP

(57) ABSTRACT

Systems and methods for wireless communication are disclosed. In one aspect an access point (AP) includes a processor configured to generate a frame with an information element (IE) assigning a restricted access window (RAW) and to determine whether or not to include a field in the IE indicating a group of one or more devices allowed to transmit during the RAW based on a type of the RAW. The processing system further includes an interface to output the generated frame for transmission. According to aspects, at least one option type (e.g., Omni) of the RAW type (e.g., Simplex) is accessible by devices regardless of their device type. Accordingly, the AP may not include the field in the IE indicating the group of one or more devices allowed to transmit during the RAW for the at least one option type of RAW.

17 Claims, 18 Drawing Sheets

(56) References Cited

OTHER PUBLICATIONS

Ghosh C (Nokia): "CC9-cluase-8-4-2-170b-comment-resolution 11-13-0813-04-00ah-cc9-cluase-8-4-2-170b-conment-resolution", IEEE Draft; 11-13-0813-04-00ah-cc9-cluase-8-4-2-170b-comment-resolution, IEEE-SA Mentor, Piscataway, NJ USA, vol. 802.11ah, No. 4, Aug. 1, 2013, pp. 1-22, XP068062755, [retrieved on Aug. 1, 2013] Final Draft Version of subclause 8.4.2.170b, RPS element format, p. 17-p. 21, figures 8-401cl, 8-401cm, 8-401cn.

International Search Report and Written Opinion—PCT/US2014/055072—ISA/EPO—Dec. 16, 2014.

Wong E. et al., "Proposed TGah Draft Amendment"; IEEE P802.11 Wireless LANs; IEEE-SA Mentor, Piscataway, NJ USA, doc.: IEEE 802.11-13/0500R0, May 10, 2013, pp. 1-330, XP068054010.

\* cited by examiner

Subfields for Different RAW Types

| Field Name | Number of Bits | RAW Type ||||
|---|---|---|---|---|---|
| | | Regular | Sounding | PRAW | Simplex |
| PRAW Indication | 1 | X | X | X | X |
| AP PM | 1 | X | X | | X |
| Same Group Indication | 1 | X | X | X | |
| Sounding RAW Indication | 1 | X | X | | |
| Start Time Indication | 1 | X | X | X | X |
| RA Presence | 1 | X | | | |
| Access Limitation | 1 | X | | | |
| Frame Type | 1 | X | | | |
| Start Time | 16 | X | X | X | X |
| Duration | 16 | X | X | X | X |
| Slot Definition | 16 | X | | | |
| Group | 24 | X | X | X | |
| Channel Indication | 8 | X | X | X | |
| PRAW Periodicity | 16 | | | X | |
| PRAW Start Offset | 16 | | | X | |

| Element ID | Length | RAW1 Assignment | RAW2 Assignment | ... | RAWN Assignment |
|---|---|---|---|---|---|
| 1 | 1 | variable | variable | | variable |

Octets:

FIG. 9B

| PRAW Indication (0) | AP PM (0) | Same Group Indication | Sounding RAW Indication | RAW Group | RAW Start Time (TU) | RAW Duration (TU) | Options | RAW Slot Definition | Channel Indication |
|---|---|---|---|---|---|---|---|---|---|
| 1 | 1 | 1 | 1 | 24 | 16 | 16 | 3 | 8 | 8 | bits:

RAW N Assignment field format for RAW

FIG. 9C

| PRAW Indication (0) | AP PM (1) | RAW Start Time (TU) | RAW Duration (TU) |
|---|---|---|---|
| 1 | 1 | 16 | 16 | bits:

RAW N Assignment field format for Simplex RAW

FIG. 9D

| PRAW Indication (0) | Same Group Indication (0) | PRAW Group | PRAW Start Time (TU) | PRAW Duration (TU) | PRAW Periodicity | PRAW Start Offset | Channel Indication |
|---|---|---|---|---|---|---|---|
| 1 | 1 | 24 | 8 | TBD | TBD | TBD | 8 | bits:

RAW N Assignment field format for PRAW

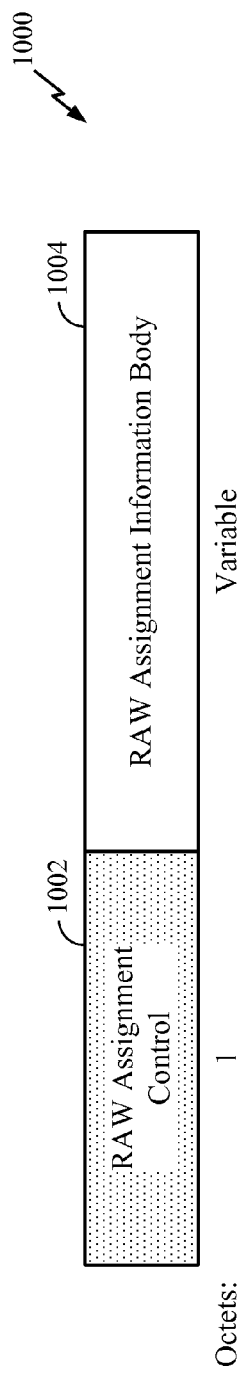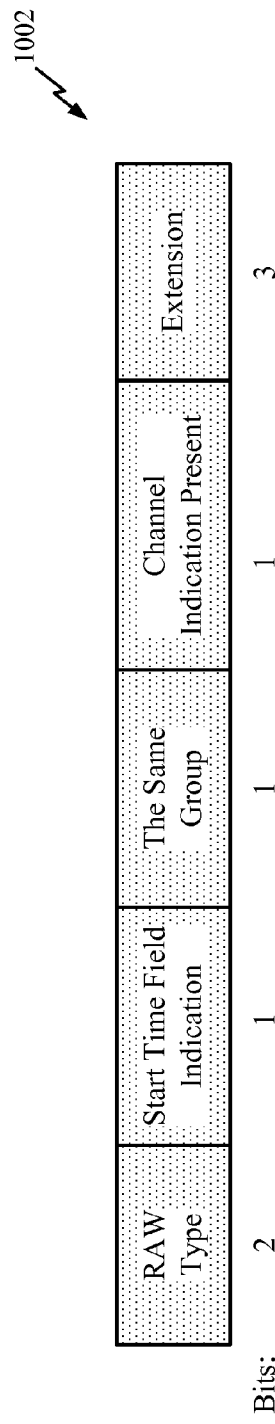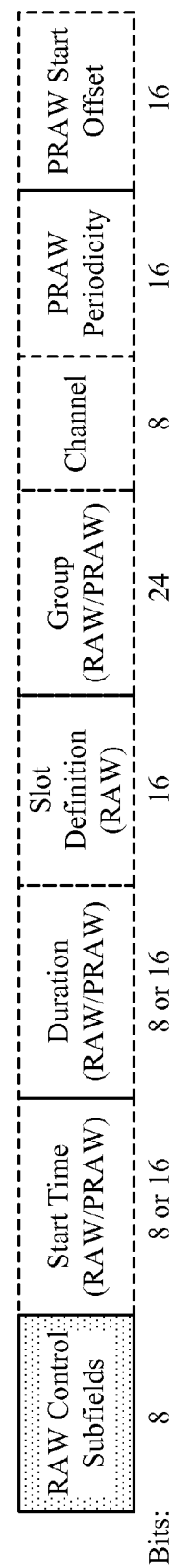
FIG. 10A
FIG. 10B
FIG. 10C

SYSTEM AND METHOD FOR IMPROVED COMMUNICATION ON A WIRELESS NETWORK

CROSS-REFERENCE TO RELATED APPLICATIONS

This application claims benefit of priority to U.S. Application Ser. No. 61/876,755, filed Sep. 11, 2013 and U.S. Application Ser. No. 61/899,880, filed Nov. 5, 2013, both of which are expressly incorporated herein by reference in their entirety.

BACKGROUND

1. Field

The present application relates generally to wireless communications, and more specifically to systems, methods, and devices for saving power using restricted access windows (RAWs).

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow sleep time for an access point.

One aspect provides an apparatus for wireless communication. The apparatus includes a processing system configured to generate a frame with an information element (IE) assigning a restricted access window (RAW) and to determine whether or not to include a field in the IE indicating a group of one or more devices allowed to transmit during the RAW based on a type of the RAW and an interface to output the generated frame for transmission.

Another aspect provides a method for wireless communication. The method generally includes generating a frame with an information element (IE) assigning a restricted access window (RAW), determining whether or not to include a field in the IE indicating a group of one or more devices allowed to transmit during the RAW based on a type of the RAW, and outputting the generated frame for transmission.

Another aspect provides an apparatus for wireless communication. The apparatus generally includes means for generating a frame with an information element (IE) assigning a restricted access window (RAW), means for determining whether or not to include a field in the IE indicating a group of one or more devices allowed to transmit during the RAW based on a type of the RAW, and means for outputting the generated frame for transmission.

Another aspect provides a computer program product for wireless communication. The computer program product generally includes a computer readable medium having instructions stored thereon for generating a frame with an information element (IE) assigning a restricted access window (RAW), determining whether or not to include a field in the IE indicating a group of one or more devices allowed to transmit during the RAW based on a type of the RAW, and outputting the generated frame for transmission.

Another aspect provides an access point for wireless communication. The access point includes at least one antenna, a processing system configured to generate a frame with an information element (IE) assigning a restricted access window (RAW) and to determine whether or not to include a field in the IE indicating a group of one or more devices allowed to transmit during the RAW based on a type of the RAW, and a transmitter configured to transmit, via the at least one antenna, the generated frame.

BRIEF DESCRIPTION OF THE DRAWINGS

FIG. 7 provides a listing of example subfields for four types of RAW, according to aspects of the present disclosure.

FIG. 9A illustrates an example RPS IE format, according to aspects of the present disclosure.

FIG. 9B illustrates example subfields of one of the N RAW assignment fields for a Regular RAW type, according to aspects of the present disclosure.

FIG. 9C illustrates example subfields of one of the N RAW assignment fields for a Simplex RAW type, according to aspects of the present disclosure.

FIG. 9D illustrates example subfields of one of the N RAW assignment fields for a PRAW type, according to aspects of the present disclosure.

FIG. 10A illustrates an example RAW assignment subfield format, according to aspects of the present disclosure.

FIG. 10B illustrates example fields of the RAW Assignment Control of the RAW Assignment subfield, according to aspects of the present disclosure.

FIG. 10C illustrates example subfields in the RAW Assignment Information Body of the RAW assignment subfield, according to aspects of the present disclosure.

DETAILED DESCRIPTION

Figure 1:
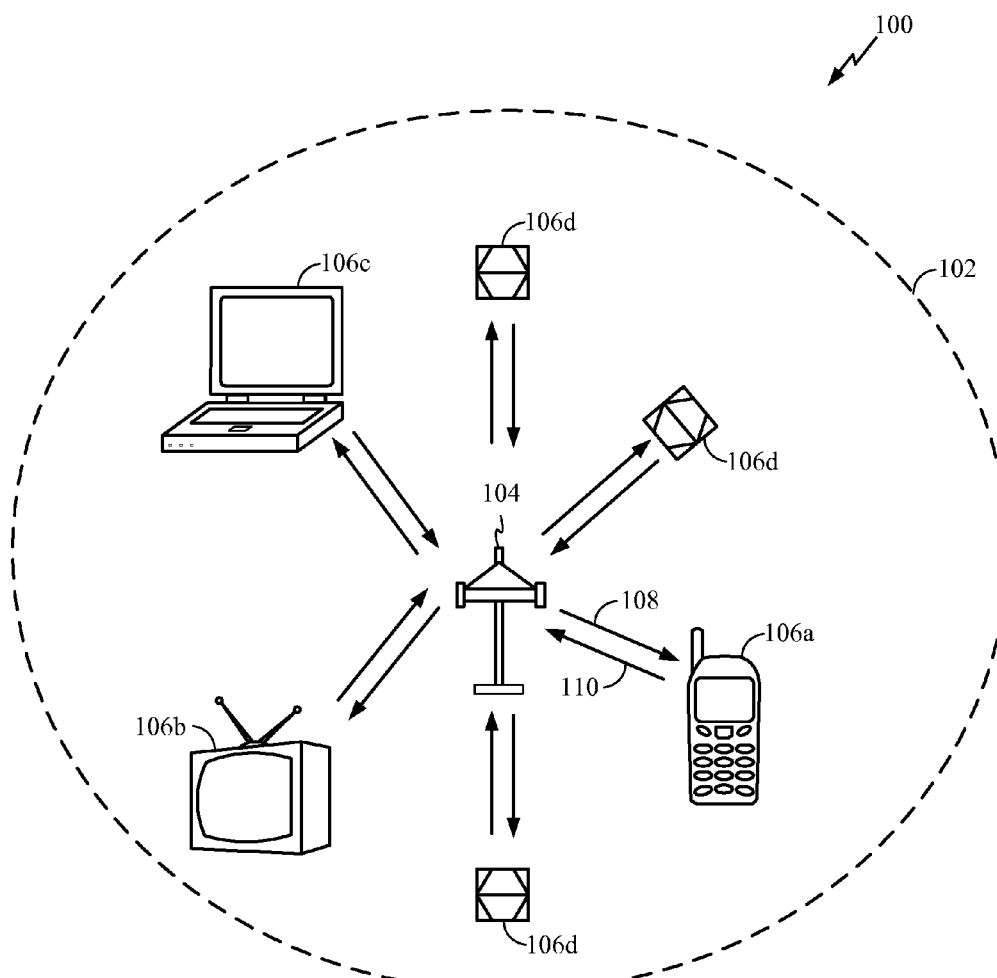
FIG. 1 illustrates an example of a wireless communication system in which aspects of the present disclosure may be employed.

As described herein, a restricted access window (RAW) may be used to define a period of time that an access point declares as reserved for a select group of wireless stations to access a communication medium. Example of RAW types include a Regular RAW type, Periodic Restricted Access RAW (PRAW), Sounding RAW, and Simplex RAW (e.g., AP Power Management (AP PM)) RAW/non-traffic indication RAW). The Simplex RAW type includes three RAW type options: AP PM RAW, Non-TIM RAW, and Omni RAW.

When the RAW type option is AP PM RAW, no stations may access the communication medium (e.g., AP). When the RAW type option is Non-TIM RAW, access is limited to non-TIM stations previously scheduled within the RAW. When the RAW type option is Omni RAW, all stations may access the medium. Based on the type option of the Simplex RAW (wherein the type options include AP PM Raw, Non-TIM Raw, and Omni RAW), a station may know whether it may access the medium during the RAW. Accordingly, indicating the "group" of stations which may access the medium during a Simplex RAW may not be necessary.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology. The access point may be a main or relay base station. A relay base station relays data between wireless stations and another base station, being the main base station or another relay base station.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. According to aspects, the AP 104 may generate a frame with an IE assigning a RAW and may determine whether or not to include a field in the IE indicating a group of one or more stations allowed to transmit during the RAW. The AP may output (e.g., transmit) the frame.

The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few.

Figure 2:
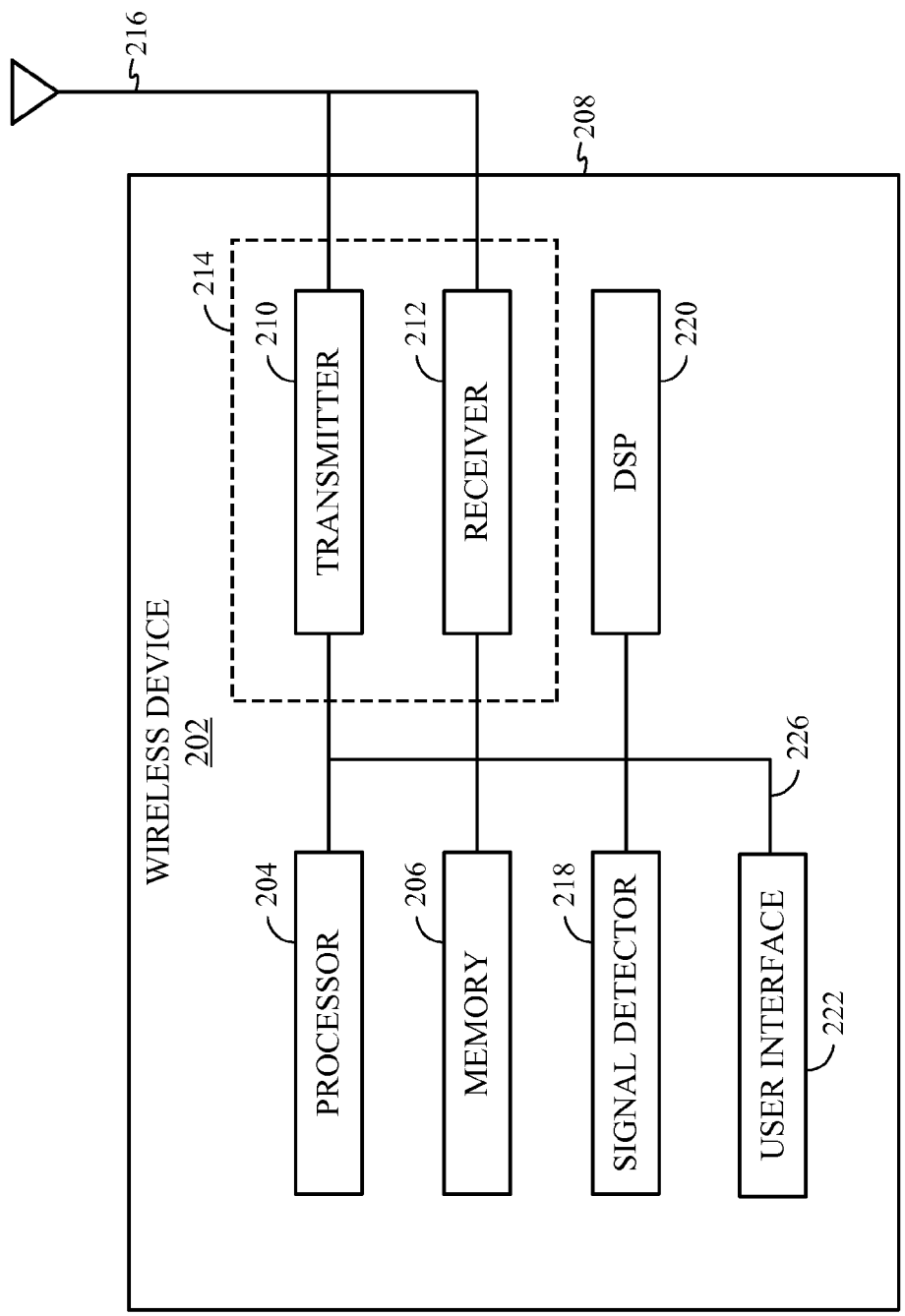
FIG. 2 illustrates an example of a wireless device that may be employed within the wireless communication system of FIG. 1.

FIG. 2 illustrates various components that may be utilized in a wireless device 202 that may be employed within the wireless communication system 100, according to aspects of the present disclosure. For example, the wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or a STA 106, and may be used to transmit and/or receive communications.

Figure 3:
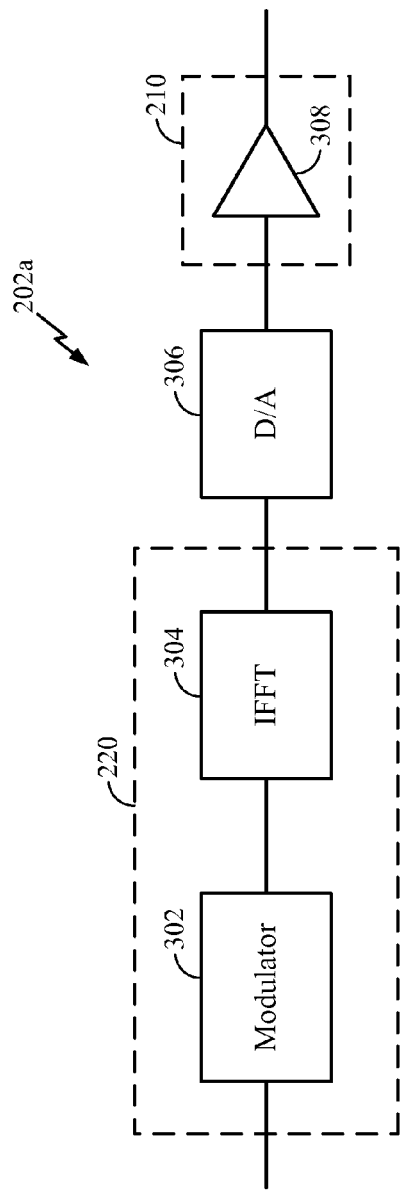
FIG. 3 illustrates an example of components that may be included within the wireless device of FIG. 2 to transmit wireless communications.

FIG. 3 illustrates various components that may be utilized in the wireless device 202 to transmit wireless communications. According to aspects, AP 104 may include various component illustrated in FIG. 3.

The components illustrated in FIG. 3 may be used, for example, to transmit OFDM communications. In some aspects, the components illustrated in FIG. 3 are used to transmit data units with training fields with peak-to-power average ratio is as low as possible. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmission processor.

The analog signal may be wirelessly transmitted by the transmitter 210. The analog signal may be further processed before being transmitted by the transmitter 210, for example by being filtered or by being upconverted to an intermediate or carrier frequency. In the implementation illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets, frames, or data units in a wireless signal based on the analog signal. The data units may be generated using the processor 204 and/or the DSP 220, for example using the modulator 302 and the transform module 304 as discussed above.

Figure 4:
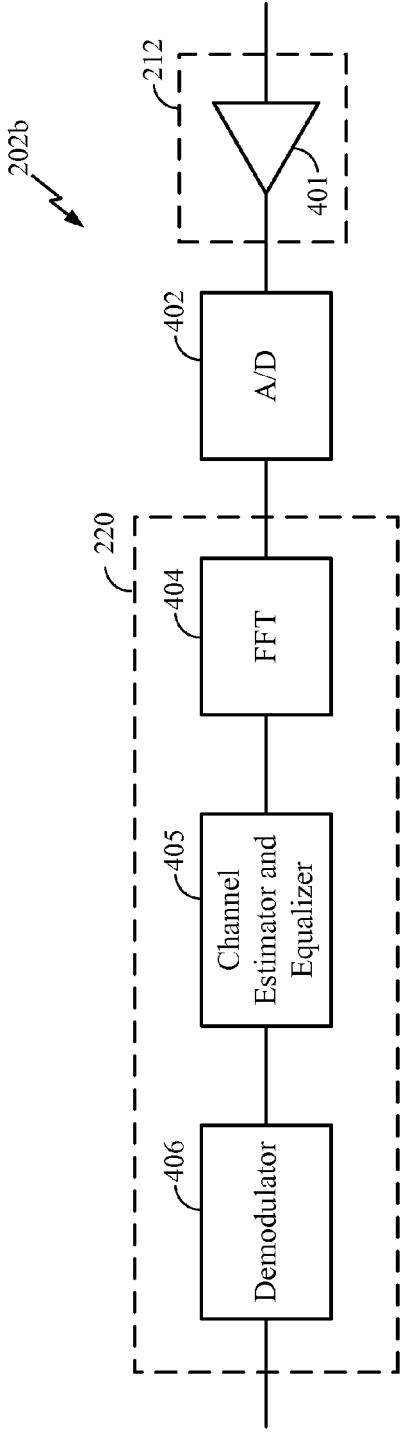
FIG. 4 illustrates an example of components that may be included within the wireless device of FIG. 2 to transmit wireless communications.

FIG. 4 illustrates various components that may be utilized in the wireless device 202 to receive wireless communications. The components illustrated in FIG. 4 may be used, for example, to receive OFDM communications. In some implementations, the components illustrated in FIG. 4 are used to receive packets, frames, or data units that include one or more training fields, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets, frames, or data units in a wireless signal.

In the implementation illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet, frame, or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

In wireless communications such as those specified in the IEEE 802.11 family of wireless protocols, multiple stations share a transmission medium using a media access control protocol. A beacon frame, which is one of management and control frames that support data transfer, may be used to establish and maintain the communications in an orderly fashion. In some applications such as those specified in the 802.11ah protocol, a restricted access window (RAW) may be used to define a period of time that an access point declares as reserved for a selected group of wireless stations. STAs that are not associated with the access point cannot contend for the medium when a restricted access window is open.

Figure 5:
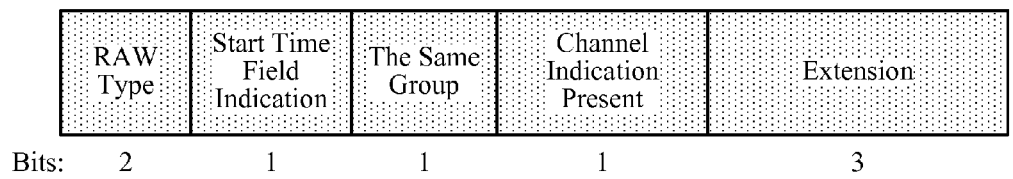
FIG. 5 illustrates an example format of a RAW assignment field, according to aspects of the present disclosure.

In some cases, a RAW assignment field, which is a field of a RAW parameter set (RPS) information element (IE) may have a defined format. FIG. 5 illustrates an example format of a RAW assignment field, according to aspects of the present disclosure. As illustrated, the RAW control subfield may include 2 bits providing a RAW type, 1 bit providing a start time field indication, 1 bit providing a same group indication, 1 bit providing a channel indication presence, and 3 bits of extension information.

As will be described in more detail herein, the type of RAW may include, for example, a Regular RAW, Sounding RAW, Periodic Restricted Access RAW (PRAW), or a Simplex RAW (e.g., AP Power Management (AP PM) RAW/ non-traffic indication (non-TIM) RAW).

A Regular RAW may be used to provide restricted medium access to a group of STAs. During a Sounding RAW, non-AP STAs may be prohibited from initiating a transmit opportunity (TXOP); however, these non-AP STAs may elect to listen to sector sounding and may transmit control response frames. An indication of a PRAW may be transmitted by an AP such that traffic indication (TIM) stations may identify the allocation of the PRAW. A Simplex RAW may be used for AP power management, for reserving channel time for non-TIM STAs, or for an Omni RAW, depending on the type (e.g., option type) of Simplex RAW. When the Simplex RAW option type is an Omni RAW, access to the medium is unrestricted and the RAW may be used by all STAs.

Figure 6:
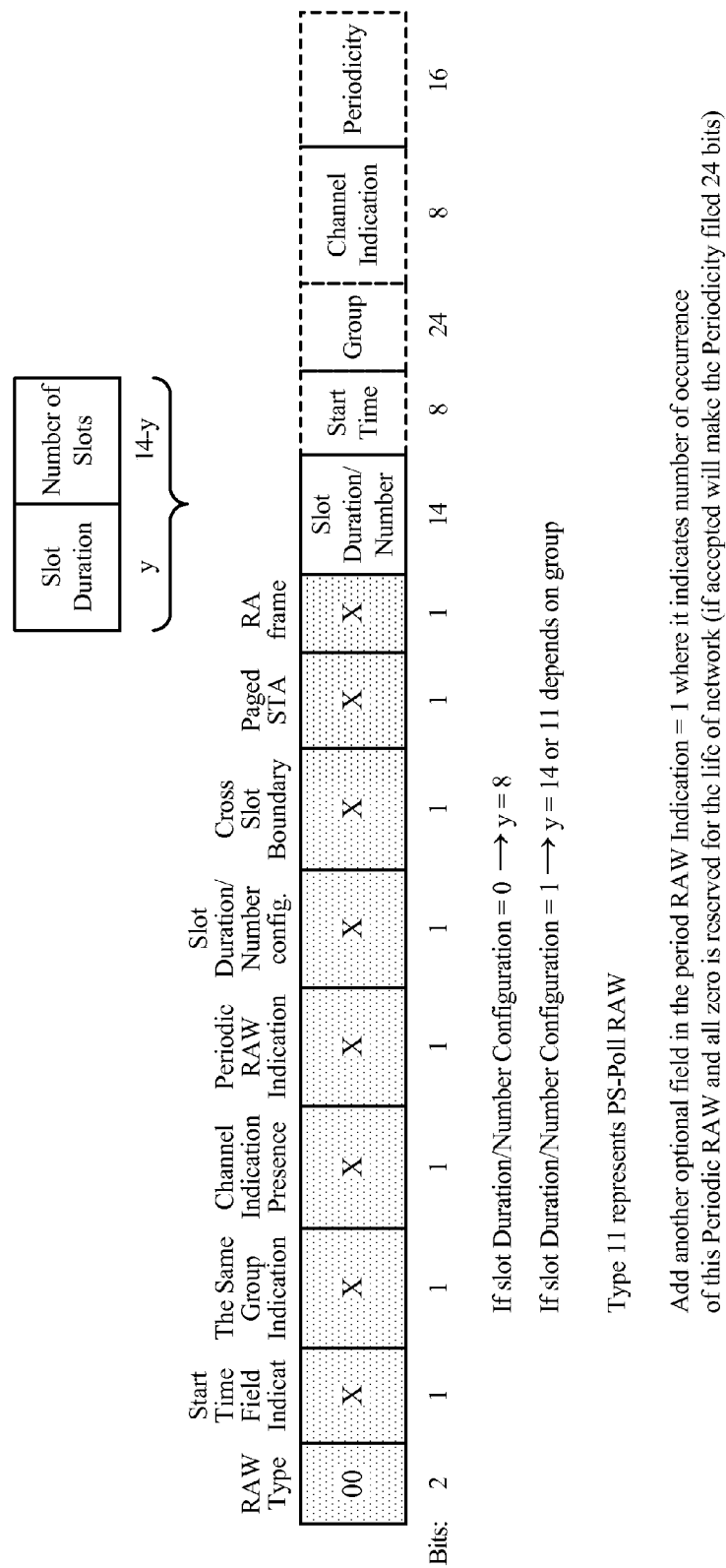
FIG. 6 illustrates example subfields of a RAW assignment field, according to aspects of the present disclosure.

FIG. 6 illustrates example subfields of a RAW assignment field, according to aspects of the present disclosure. As illustrated in FIG. 6, a control portion of the RAW assignment field may have a field (e.g., Duration/Number Configuration) with one or more bits that indicate a value of at least two fields (e.g., Slot Duration and Number of Slots) in an information portion of the RAW assignment field. For example, if the Duration/Number Configuration=0 in the control portion of the RAW, the Slot Duration may include 8 bits of information and the Number of Slots may include 6 bits of information, where both the Slot Duration and the Number of Slots are in the information portion of the RAW assignment field. As another example, if the Duration/Number Configuration=1 in the control portion of the RAW, the Slot Duration, in the information portion of the RAW, may include 14 or 11 bits of information, depending on a group.

Thus, aspects of the present disclosure provide a method performed, for example, by an AP, such as AP 104, which may include one or more components of wireless device 202. The AP may generate a RAW assignment frame. The frame may have a control portion with a field having at least one bit that indicates a value of at least two fields in an information portion of the RAW assignment frame. The AP may transmit the generated RAW assignment frame. As described above, and as illustrated in FIG. 6, the at least one bit may indicate a value of a slot duration field and a value of a number of slots field.

Similarly, according to aspects, a STA, including STA 106, which may include one or more components of wireless device 202 may receive a RAW assignment frame. The RAW assignment frame may include a control portion with a field having at least one bit that indicates a value of at least two fields in an information portion of the RAW assignment frame. Based on the at least one bit, the STA may determine the value of the at least two fields. As described above, and as illustrated in FIG. 6, the STA may receive a bit indicating a value of a slot duration field and a value of a number of slots field.

FIG. 7 provides a listing of example subfields for four types of RAW: Regular RAW, Sounding RAW, PRAW, and Simplex RAW. As shown in FIG. 7, some of the subfields may be shared by these four types of RAWs, such as the PRAW Indication, Start Time Indication, Start Time, and Duration subfields.

Some of the subfields may be shared by less than all of the four RAW types. For example, the Same Group indication, Group, and Channel Indication may be shared by Regular RAW, Sounding RAW, and PRAW types and the sounding RAW indication may be shared by the Regular RAW and Sounding RAW types.

Further, some of the subfields may only be used by individual RAW types. For example, RA Presence, Access Limitation, and Frame Type may be used by Regular RAW only, and PRAW Periodicity and PRAW Start Offset may be used by PRAW only.

Figure 8A:
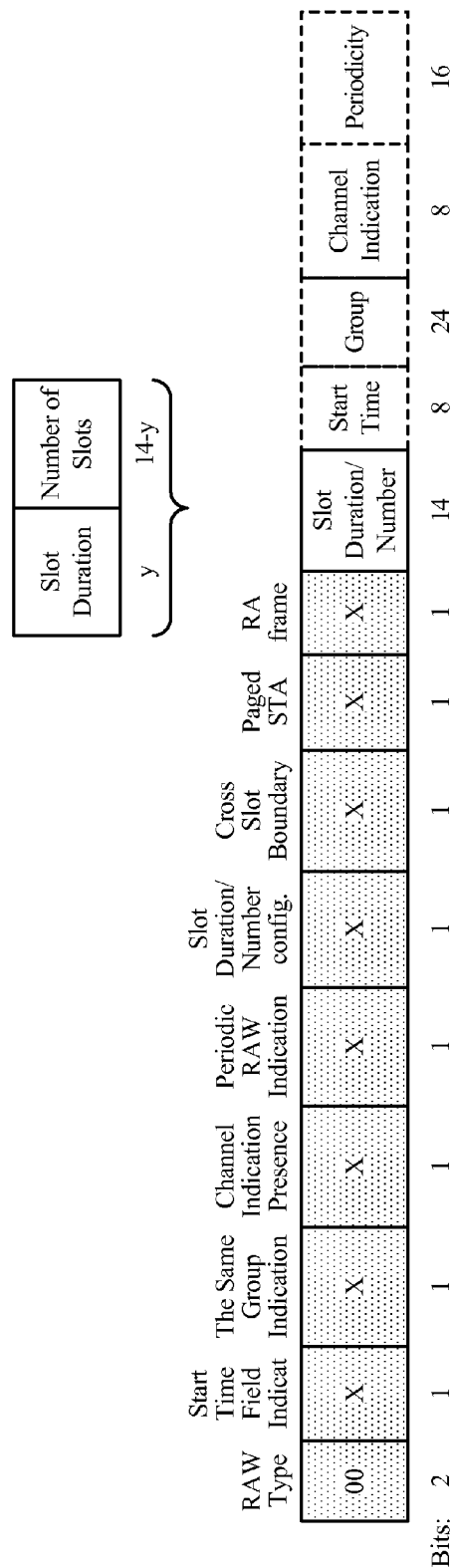
FIG. 8A illustrates an example for a regular RAW, according to aspects of the present disclosure.
Figure 8B:
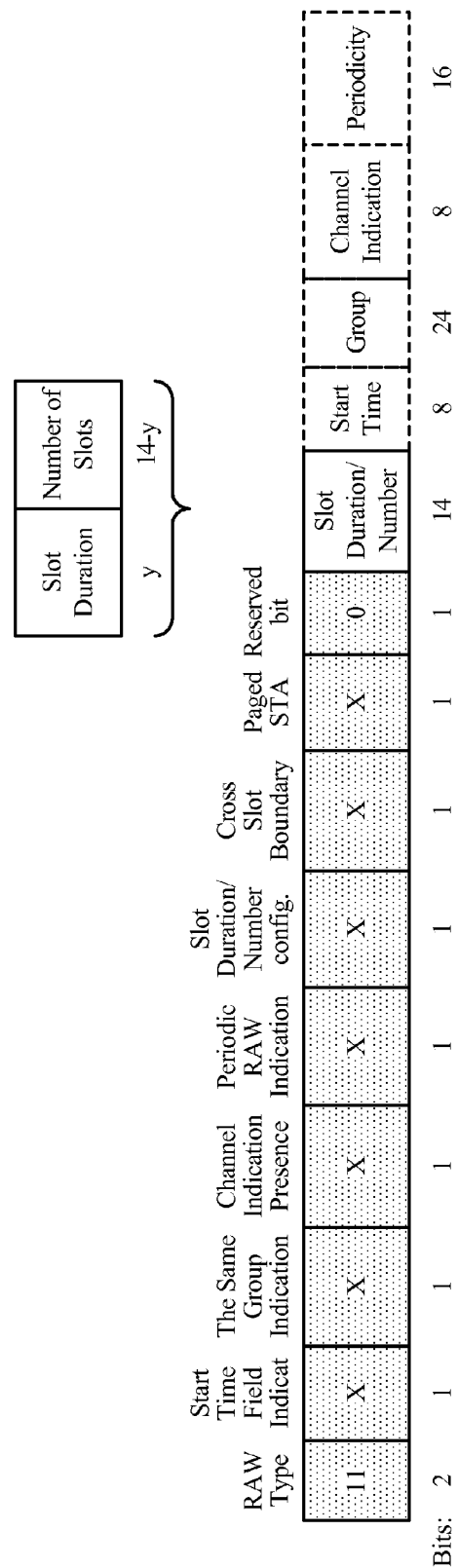
FIG. 8B illustrates an example for a PS-Poll RAW kind of PRAW, according to aspects of the present disclosure.
Figure 8C:
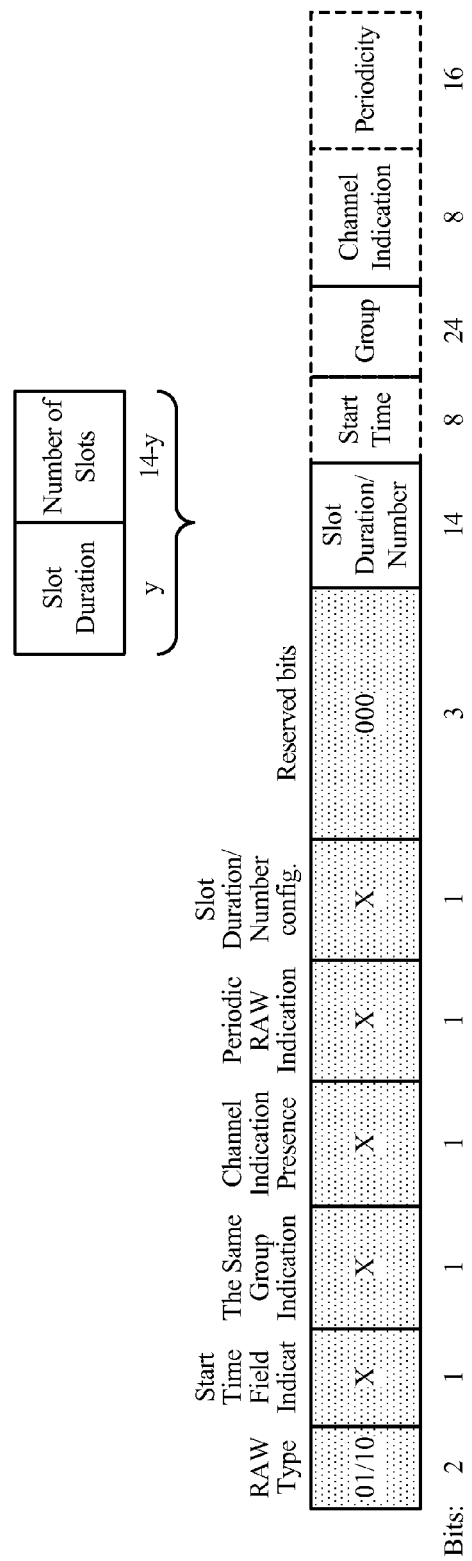
FIG. 8C illustrates an example for a Sounding or Simplex RAW, according to aspects of the present disclosure.

FIG. 8A illustrates an example for a regular RAW (e.g., with the 2 bit RAW TYPE field=00). FIG. 8B illustrates an example for a PS-Poll RAW kind of PRAW (e.g., with the 2 bit RAW TYPE field=11). FIG. 8C illustrates an example for a Sounding or Simplex RAW (e.g., with the 2 bit RAW TYPE field=01 or 10). As illustrated in FIGS. 8A-8C, the RAW types have some subfields in common and have some subfields which are not shared. Further, each of FIGS. 8A-8C include a Group field.

According to aspects of the present disclosure, the format of a RPS IE provides flexibility to account for the different types of fields in different RAW assignment types. According to aspects, some fields may be made flexible, in an effort to reduce signaling overhead. For example, the Start Time, Duration, and/or Channel Indication may be made more flexible as described below.

It may not be necessary, for example, when a beacon interval is short, for the Start Time and Duration fields to be encoded in 16 bits in a time unit. Thus, according to aspects, when the beacon interval is less than 256 time units, the Start Time and Duration fields may be encoded using 8 bits in a time unit. Otherwise, these fields may be encoded using 16 bits.

It may not be necessary to include the Channel Indication field, when only the primary channel is being used for transmission (e.g., for 1 MHz). According to aspects, a Channel Indication Presence subfield may be added to the RAW Assignment field to indicate whether or not a Channel Indication subfield is present. For example, when the Channel Indication Presence subfield=0, the Channel Indication field may not be present. When the Channel Indication Presence subfield=1, the Channel Indication field may be present.

For Regular RAW assignments, both Duration and Slot Definition may be present. However, since the Duration may be derived from the Slot Definition (e.g., by multiplying the Slot Duration by the Number of Slots), according to aspects, for a Regular RAW assignment, the duration field may not be present.

FIG. 9A illustrates an example RPS IE format, according to aspects of the present disclosure. As illustrated in FIG. 9A, the RPS IE includes N RAW Assignment fields. FIG. 9B illustrates example subfields of one of the N RAW assignment fields for a Regular RAW type. FIG. 9C illustrates example subfields of one of the N RAW assignment fields for a Simplex RAW type (e.g., option type AP PM RAW). FIG. 9D illustrates example subfields of one of the N RAW assignment fields for a PRAW type.

Aspects of the present disclosure provide a unified RAW assignment field format that may be used for different RAW types. As described above, different RAW types may include Regular RAW, Sounding RAW, Simplex RAW, and PRAW. In an effort to unify the definitions for different RAW types, each RAW assignment subfield may contain a control portion and an information body.

FIG. 10A illustrates an example RAW assignment subfield format 1000, according to aspects of the present disclosure. Each of the N RAW assignment subfields, for example, as illustrated in FIG. 9A, may contain a RAW Assignment Control portion 1002 and a variable length RAW Assignment Information Body 1004, as shown in FIG. 10A.

FIG. 10B illustrates example fields of the RAW Assignment Control 1002 of the RAW Assignment subfield format 1000, similar to the RAW Assignment Control field illustrated in FIG. 5. The RAW Assignment Control subfield 1002 may contain one or more subfields indicating a RAW type, a Start Time Field Indication, a Same Group Indication, a Channel Indication Present field, and an Extension field. The RAW type field may include two bits of information which may indicate a Regular RAW, Sounding RAW, Simplex RAW, or PRAW RAW.

The Start Time Indication, Same Group Indication, and Channel Indication Present may be set to a value depending on whether the subfield is present in the RAW Assignment subfield. For example, according to aspects, the Start Time Indication field may be set to 0 when the Start Time subfield is not present and may be set to 1 when the Start time subfield is present, the Same Group Indication may be set to 0 when a group subfield is present and may be set to 1 when the group subfield is not present, and the Channel Indication Present may be set to 0 when the channel indication is not present and may be set to 1 when the channel indication is present.

According to aspects, the Extension subfield may include 3 bits defined by type of RAW.

FIG. 10C illustrates example subfields in the RAW Assignment Information Body 1004 of the RAW assignment subfield format 1000. For example, the subfields in the RAW Assignment Information Body may be encoded in the order shown in FIG. 10C, in an effort to make encoding by a transmitter and decoding by a receiver easier. As illustrated, the RAW Assignment Information Body may include 8 bits of RAW control subfields, 8 or 16 bits of start time indication, 8 or 16 bits of a duration indication, 16 bits of slot definition indication, 24 bits of a group indication, 8 bits of a channel indication, 16 bits of a PRAW periodicity, and 16 bits of a PRAW start offset.

Figure 11:
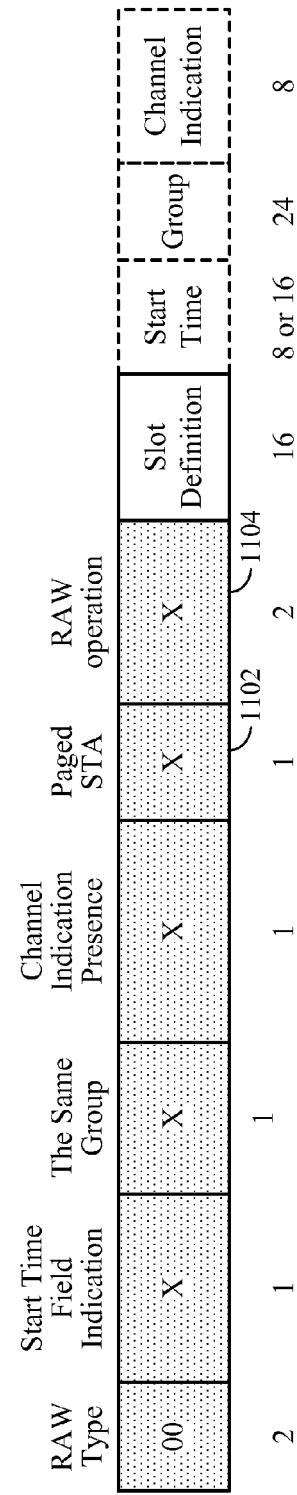
FIG. 11 illustrates an example of a Regular RAW type, according to aspects of the present disclosure.

FIG. 11 illustrates an example of a Regular RAW type (e.g., RAW type=00), according to aspects of the present disclosure. As described with reference to FIG. 10B, the Extension subfield, of the RAW Assignment Control subfield 1002, may include 3 bits defined by type of RAW. According to aspects, for a Regular RAW type, the three Extension bits may indicate Restricted Access (RA), Paged Station, and a Frame Type. For example, and as illustrated, the Extension subfield may include 1 bit indicating a Paged STA 1102 and 2 bits indicated the RAW Operation 1104. A RAW operation=00 may indicate RA is not present and may indicate any frame type (16 bits). A RAW operation=01 may indicate that RA is not present and may indicate any frame type (8 bits). A RAW operation=10 may indicate that RA is present and may indicate any frame type of a fixed number of bits. A RAW operation=11 may indicate that RA is not present and may indicate a frame may only be a PS-Poll (8 bits). As illustrated, the Group field may be present for the Regular RAW type.

Figure 12:
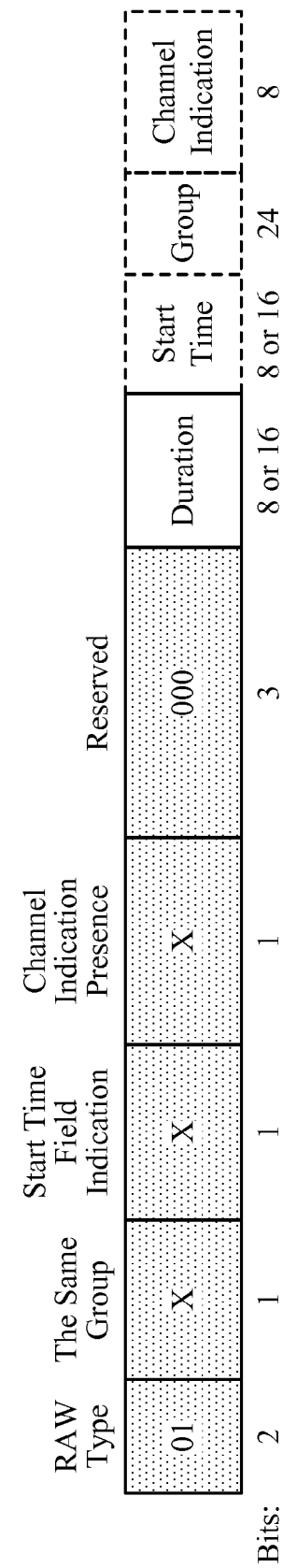
FIG. 12 illustrates an example of a Sounding RAW type, according to aspects of the present disclosure.

FIG. 12 illustrates an example of a Sounding RAW type (e.g., RAW type=01), according to aspects of the present disclosure. As shown in FIG. 12, the 3 bits of the Extension field may be reserved. As illustrated, the Group field may be present for the Sounding RAW type.

Figure 13:
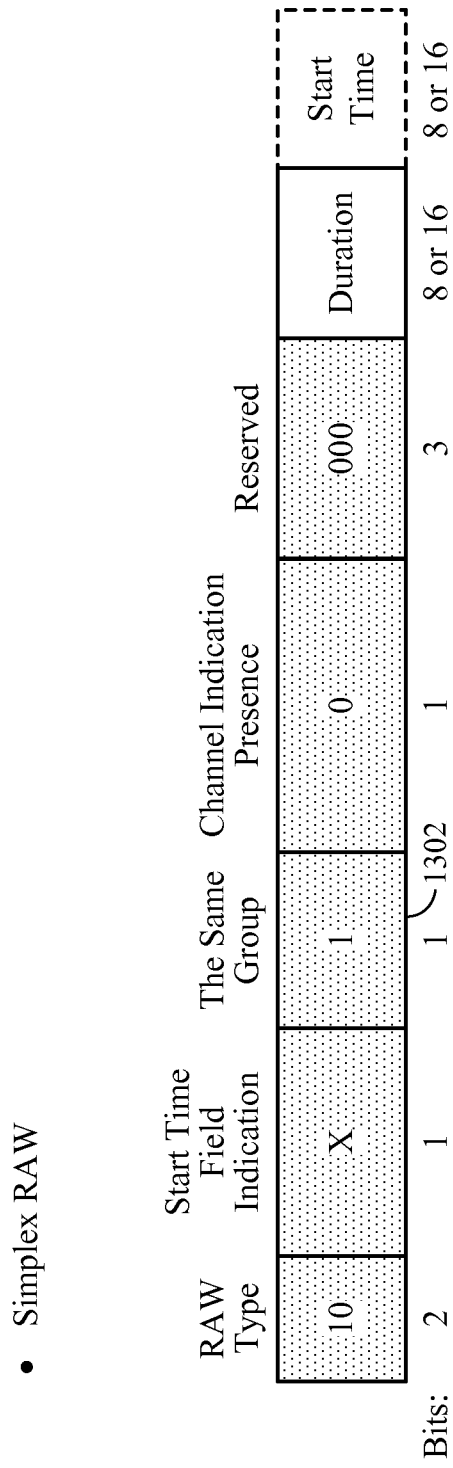
FIG. 13 illustrates an example of a Simplex RAW type, according to aspects of the present disclosure.

FIG. 13 illustrates an example of a Simplex RAW type (e.g., RAW type=10), according to aspects of the present disclosure. According to aspects, and as illustrated, the Group field may not be present for the Simplex RAW type.

Figure 14:
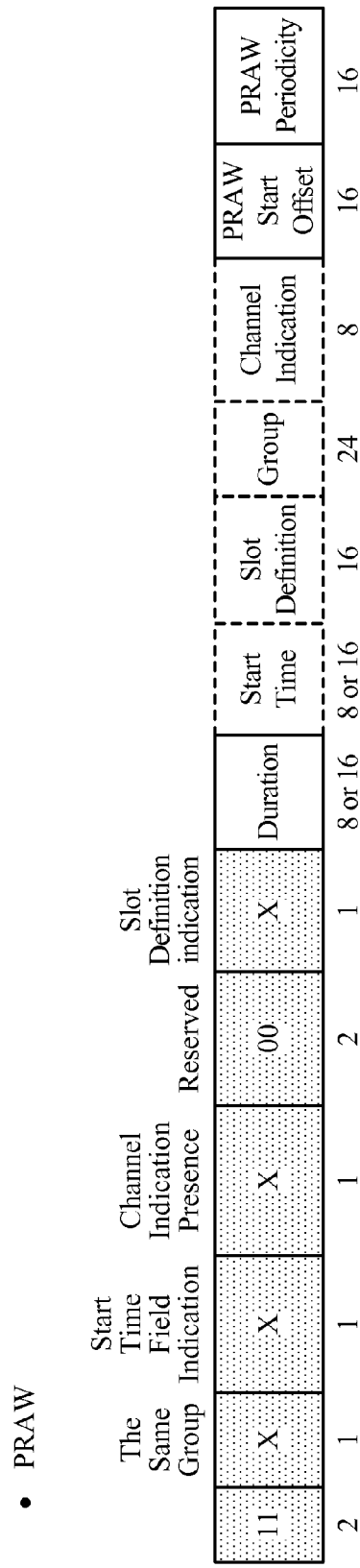
FIG. 14 illustrates an example of a PRAW RAW type, according to aspects of the present disclosure.

FIG. 14 illustrates an example of a PRAW RAW type (e.g., RAW type=11), according to aspects of the present disclosure. As illustrated, the Group field may be present for the PRAW RAW type.

As described above, in some cases, a RAW "Group" field may not be required for certain RAW types, such as the Simplex RAW type as shown in FIG. 13. Three RAW type options may exist for the Simplex RAW type. These RAW type options include AP PM RAW, Non-TIM RAW, and Omni RAW. When the RAW option type is AP PM RAW, no STAs may access the AP. When the RAW type option is Non-TIM RAW of the Simplex RAW type, access is restricted to non-TIM STAs previously scheduled within the RAW. When the RAW type option is Omni RAW of the Simplex RAW type, access is not restricted for any specific STA. During an Omni RAW, all STAs may access the medium. Thus, the Omni RAW may be accessible for all STAs, for example, regardless of types or association status (and may also be accessible for new associations).

Based on the RAW type options (e.g., AP PM RAW, Non-TIM RAW, and Omni RAW) of the Simplex RAW type, a STA may know whether it may access the medium during the RAW. For example, during an AP PM type option, the AP may be sleeping, therefore no STA may access the AP. During the AP PM type option, STAs may still communicate with each other. During a non-TIM RAW type option, only non-TIM stations may access the medium. During an Omni type option of the Simplex RAW type, all STAs may access the medium. Accordingly, indicating the "Group" of STAs which may access the medium during a Simplex RAW type may not be necessary. Thus, according to aspects described herein, there may be no need for a RAW Group field for the Simplex type of RAW.

Thus, in an effort to further reduce signaling overhead, the RAW "Group" field may not be included in information body 1004 of certain RAW types (e.g., Simplex RAW type). For example, as illustrated in FIG. 13, the "Group" subfield is not included in the in the RAW Assignment Information Body for the Simplex RAW Type (e.g., Raw Type=10).

According to aspects, the Same Group Indication field 1302 may not be necessary when the Group field is not included in the information body for the Simplex RAW type. For example, the Same Group Indication typically indicates that the group of the RAW is the same as the group of the previous RAW. Thus, the Same Group Indication field 1302 may be reserved and used for another purpose when the Group field is not included in the Simplex RAW information body.

According to an aspect, the Same Group Indication field may be used to indicate a subset of stations that may or may not access the medium during the Simplex RAW type. In this manner, the Same Group Indication field may be repurposed to further narrow down the group of STAs that may access the medium during this Simplex RAW type.

According to an aspect, the Same Group Indication field may include one bit. The Same Group Indication bit set to 1 may indicate that a narrower group of STAs for the specific RAW type option may or may not access the medium. The Same Group Indication bit set to 0 may indicate no such grouping of STAs.

An Omni type option of a Simplex RAW type may indicate that all stations may access the medium. According to aspects, the Same Group Indication bit may indicate a further narrowing the group of STAs that may access the medium during the Simplex RAW. In this manner, the Same Group Indication may indicate presence of "RAW Group" for this type of RAW.

Figure 15:
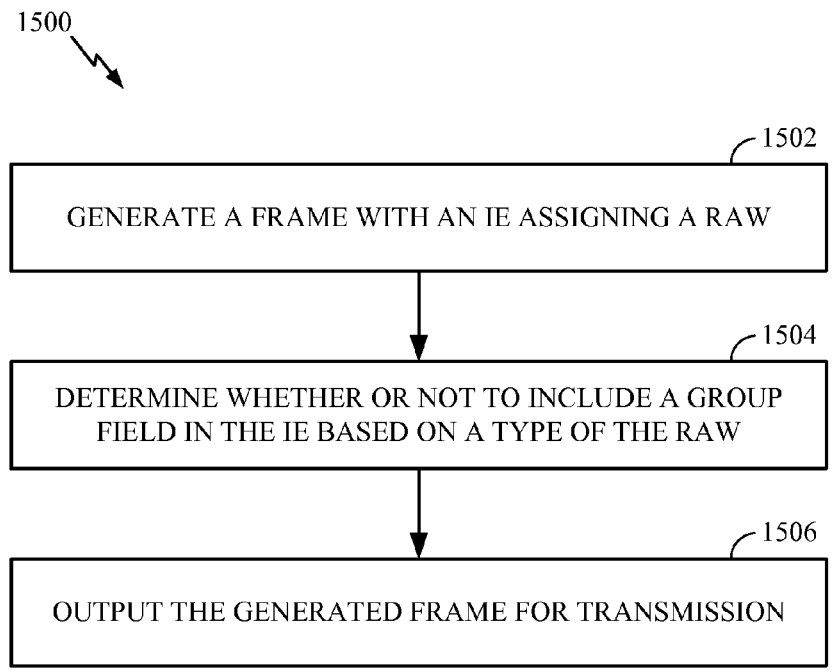
FIG. 15 illustrates example operations performed by an AP, according to aspects of the present disclosure.
Figure 15A:
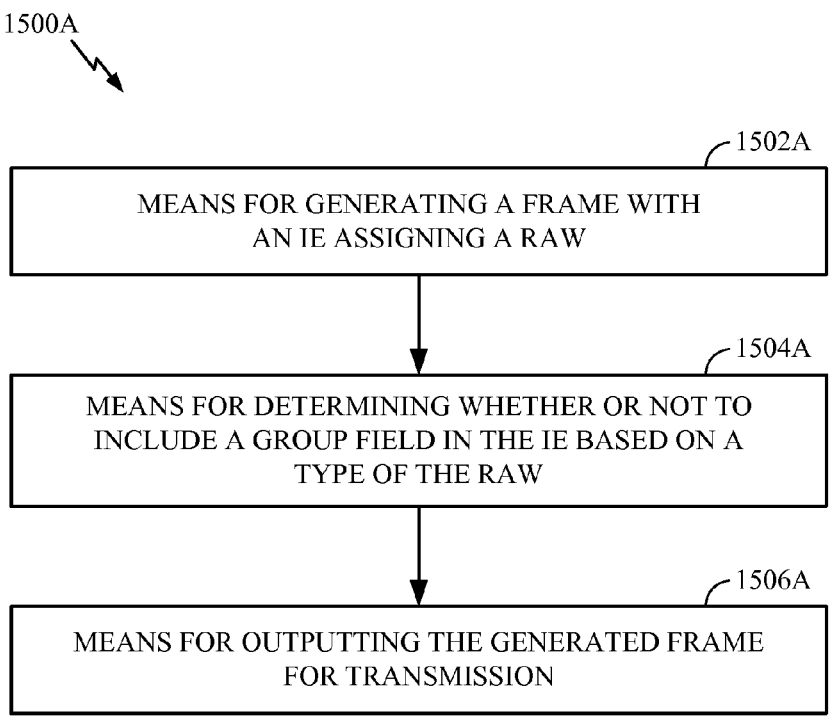
FIG. 15A illustrates example components capable of performing the operations shown in FIG. 15.

FIG. 15 illustrates example operations 1500 that may be performed in accordance with aspects of the present disclosure. The operations 1500 may be performed, for example, by an AP such as AP 104 of FIG. 1, which may include one or more components of wireless device 202.

At 1502, the AP may generate a frame with an information element (IE) assigning a restricted access window (RAW). At 1504, the AP may determine whether or not to include a field in the IE indicating a group of one or more devices allowed to transmit during the RAW based on a type of the RAW. At 1506, the AP may output the generated frame for transmission.

As described above, the AP may indicate the at least one type of RAW by setting subfield of a RAW type filed to a certain value.

According to aspects, the AP may determine not to include the field in IEs of a Simplex RAW type. The AP may indicate the presence or absence of the IE field. According to an aspect, the indication may be provided via one or more bits of a Same Group Indication field. As described above, at least one option type (e.g., Omni) of the RAW type (e.g., Simplex) may be accessible by all devices regardless of their device type. Accordingly, the AP may determine not to include the IE field for at least this option type of RAW. In other words, the AP may determine not to include the group field in the IE if at least one option type of the RAW type indicates that a group of one or more devices, regardless of their device type, can communicate during the RAW. For example, the AP may determine not to include the group field in the IE if at least one option type of the RAW type indicates that a group of one or more devices, regardless of their device type, can transmit and/or receive during the RAW.

According to aspects, the AP may indicate at least one subgroup of devices that are allowed to transmit during the RAW. The subgroup of devices may include at least one device of the group of one or more devices that is allowed to communicate (e.g., transmit and/or receive) during the RAW. Thus, the subgroup of devices may further narrow the devices that are allowed to access the medium with a same option type of RAW.

Figure 16:
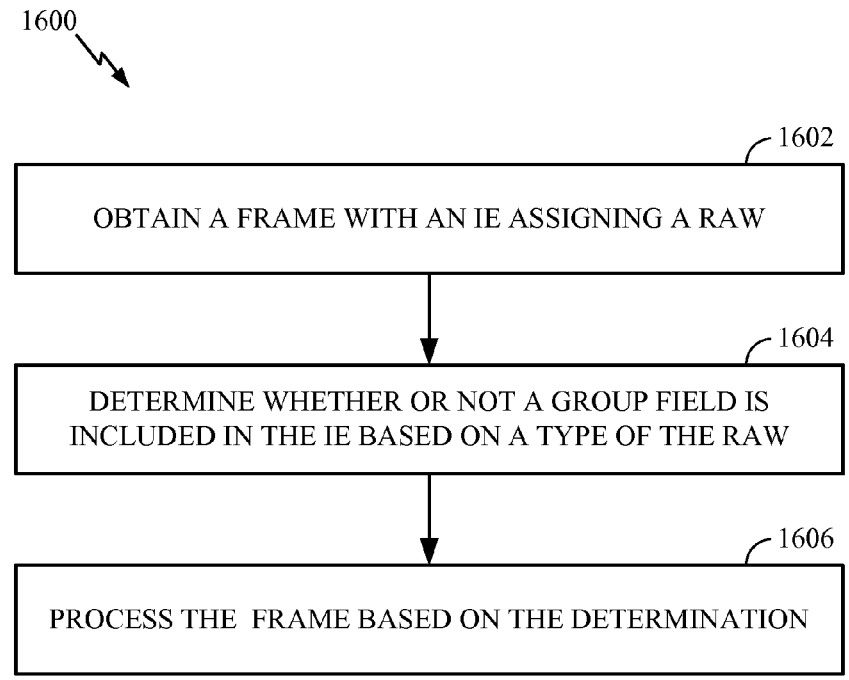
FIG. 16 illustrates example operations performed by a non-AP device, according to aspects of the present disclosure.
Figure 16A:
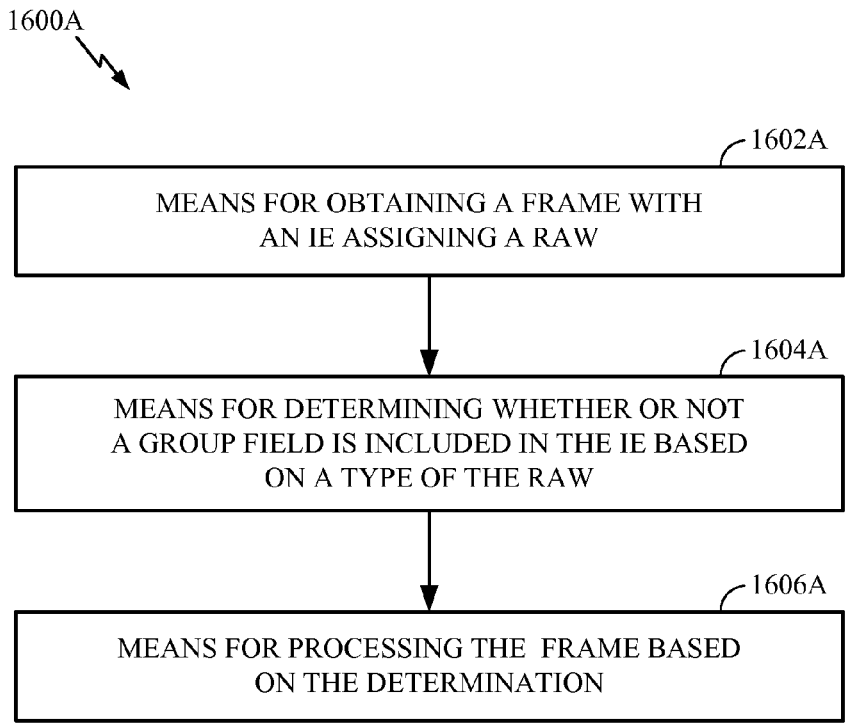
FIG. 16A illustrates example components capable of performing the operations shown in FIG. 16.

FIG. 16 illustrates example operations 1600 of wireless communication in accordance with aspects of the present disclosure. The operations 1600 may be performed, for example, by a non-AP station, and may be considered complementary to operations 1500 shown in FIG. 15.

At 1602, the non-AP station may obtain a frame with an IE assigning a RAW (e.g., by receiving the frame directly or receiving the frame from an RF front end device). At 1604, the non-AP STA may determine whether or not a group field is included in the IE based on a type of the RAW and, at 1606, the non-AP STA may process the frame based on the determination.

Figure 17:
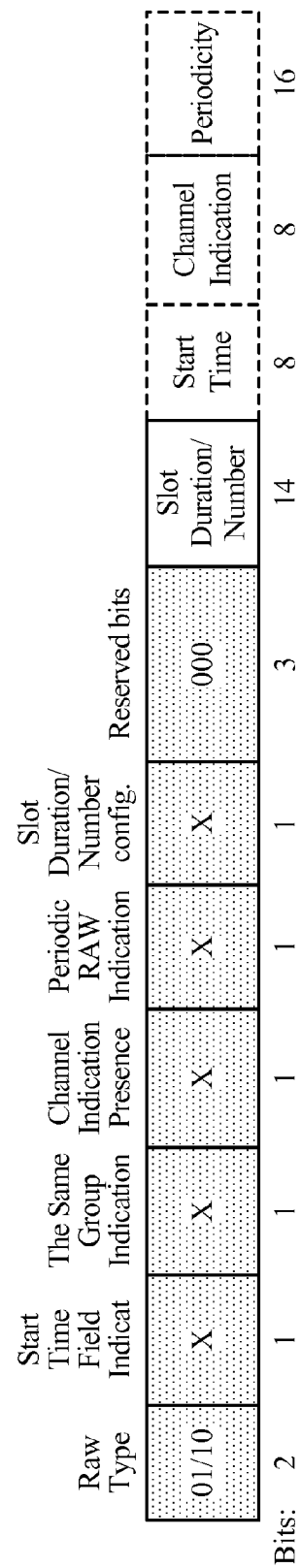
FIG. 17 illustrates an example format for a RAW Assignment, according to aspects of the present disclosure.

FIG. 17 illustrates an example Format for a RAW Assignment in accordance with an aspect of the present disclosure. The illustrated example may correspond to a Sounding or Simplex RAW type. Comparing the example to the example shown in, for example, FIGS. 8B and 8C, it can be seen that the example shown in FIG. 17 does not include a RAW Group field.

According to certain aspects, a "Same Group Indication" field may be reserved for the Simplex RAW type. In some cases, the "Same Group Indication" may be used to indicate presence of "RAW Group" for this type of RAW (e.g., a subset of devices of the RAW Group type).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
a processing system configured to:
generate a frame with an information element (IE) assigning a restricted access window (RAW) and determine whether or not to include a field in the IE indicating a group of one or more devices allowed to transmit during the RAW based on a type of the RAW, wherein the determination is not to include the field in the IE if at least one option type of the RAW type indicates a group of one or more devices, regardless of their device type, can communicate during the RAW; and
an interface to output the generated frame for transmission.

2. The apparatus of claim 1, wherein the processing system is further configured to determine not to include the field for IEs of a Simplex RAW type.

3. The apparatus of claim 1, wherein the processing system is further configured to indicate, in the IE, the presence or absence of the field.

4. The apparatus of claim 3, wherein the indication is provided via one or more bits of a Same Group Indication field of the IE.

5. The apparatus of claim 1, wherein the at least one option type is Omni and the RAW type is Simplex.

6. The apparatus of claim 1, wherein the processing system is configured to indicate the at least one option type of the RAW type by setting a subfield of a RAW type field to a certain value.

7. The apparatus of claim 1, wherein the processing system is configured to indicate at least one subgroup of devices that are allowed to communicate during the RAW, wherein the subgroup of devices includes at least one device from the group of one or more devices allowed to communicate during the RAW.

8. A method for wireless communication, comprising:
generating a frame with an information element (IE) assigning a restricted access window (RAW);
determining whether or not to include a field in the IE indicating a group of one or more devices allowed to transmit during the RAW based on a type of the RAW, wherein the determination is not to include the field in the IE if at least one option type of the RAW type indicates a group of one or more devices, regardless of their device type, can communicate during the RAW; and
outputting the generated frame for transmission.

9. The method of claim 8, wherein the determining whether or not to include a field in the IE indicating a group of one or more devices allowed to transmit during the RAW based on a type of the RAW comprises determining not to include the field for IEs of a Simplex RAW type.

10. The method of claim 8, further comprising indicating, in the IE, the presence or absence of the field.

11. The method of claim 10, wherein the indication is provided via one or more bits of a Same Group Indication field of the IE.

12. The method of claim 8, wherein the option type is Omni and the RAW type is Simplex.

13. The method of claim 8, further comprising indicating the at least one option type of the RAW type by setting a subfield of a RAW type field to a certain value.

14. The method of claim 8, further comprising indicating at least one subgroup of devices that are allowed to communicate during the RAW, wherein the subgroup of devices includes at least one device from the group of one or more devices allowed to communicate during the RAW.

15. An apparatus for wireless communication, comprising:
- means for generating a frame with an information element (IE) assigning a restricted access window (RAW);
- means for determining whether or not to include a field in the IE indicating a group of one or more devices allowed to transmit during the RAW based on a type of the RAW, wherein the means for determining determines not to include the field in the IE if at least one option type of the RAW type indicates a group of one or more devices, regardless of their device type, can communicate during the RAW; and
- means for outputting the generated frame for transmission.

16. A non-transitory computer readable medium having instructions stored thereon for:
- generating a frame with an information element (IE) assigning a restricted access window (RAW);
- determining whether or not to include a field in the IE indicating a group of one or more devices allowed to transmit during the RAW based on a type of the RAW, wherein the determination is not to include the field in the IE if at least one option type of the RAW type indicates a group of one or more devices, regardless of their device type, can communicate during the RAW; and
- outputting the generated frame for transmission.

17. An access point (AP), comprising:
- at least one antenna;
- a processing system configured to:
  - generating a frame with an information element (IE) assigning a restricted access window (RAW); and
  - determining whether or not to include a field in the IE indicating a group of one or more devices allowed to transmit during the RAW based on a type of the RAW, wherein the determination is not to include the field in the IE if at least one option type of the RAW type indicates a group of one or more devices, regardless of their device type, can communicate during the RAW; and
- a transmitter configured to:
  - transmit, via the at least one antenna, the generated frame for transmission.

* * * * *